(12) United States Patent
Zhang et al.

(10) Patent No.: US 8,505,273 B2
(45) Date of Patent: Aug. 13, 2013

(54) SYSTEM FOR ICE AND/OR FROST PREVENTION USING GUIDED WAVE ENERGY

(75) Inventors: Hua Zhang, Greer, SC (US); Jianmin Zhang, Greer, SC (US)

(73) Assignee: General Electric Company, Schenectady, NY (US)

( * ) Notice: Subject to any disclaimer, the term of this patent is extended or adjusted under 35 U.S.C. 154(b) by 783 days.

(21) Appl. No.: 12/611,332

(22) Filed: Nov. 3, 2009

(65) Prior Publication Data
US 2011/0099970 A1    May 5, 2011

(51) Int. Cl.
*F02G 3/00* (2006.01)

(52) U.S. Cl.
USPC ........................................ 60/39.093; 219/679

(58) Field of Classification Search
USPC ......... 60/39.092–39.093, 266, 728; 219/678, 219/679, 683, 690, 698, 703
See application file for complete search history.

(56) References Cited

U.S. PATENT DOCUMENTS

| | | | |
|---|---|---|---|
| 3,877,245 A | 4/1975 | Edwards | |
| 4,328,666 A | 5/1982 | Cummins, Jr. | |
| 4,831,819 A | 5/1989 | Norris et al. | |
| 5,134,266 A | 7/1992 | Peppard | |
| 5,417,389 A | 5/1995 | Chew et al. | |
| 5,623,821 A * | 4/1997 | Bouiller et al. | 60/39.093 |
| 6,610,969 B2 * | 8/2003 | Feher | 219/679 |
| 6,787,744 B1 | 9/2004 | Feher et al. | |
| 6,825,451 B1 | 11/2004 | Deangelis | |
| 2010/0101206 A1 | 4/2010 | Haehner et al. | |

FOREIGN PATENT DOCUMENTS

| | | |
|---|---|---|
| DE | 4029372 A1 | 9/1991 |
| FR | 2914016 A1 | 9/2008 |
| GB | 2292422 A | 2/1996 |
| JP | 8193435 A | 7/1996 |
| WO | WO9832970 A1 | 7/1998 |

OTHER PUBLICATIONS

Great Britain Search Report issued in connection with corresponding GB Application No. GB1018241.8, Feb. 25, 2011.

* cited by examiner

*Primary Examiner* — Phutthiwat Wongwian
(74) *Attorney, Agent, or Firm* — Hoffman Warnick LLC; Ernest G. Cusick

(57) ABSTRACT

An ice and/or frost preventing system for positioning in an airflow tunnel having an air inlet includes a plurality of waveguide passages positioned in the airflow tunnel; an air filter positioned in each waveguide passage; a microwave energy source coupled to each waveguide passage; a first screen positioned in the airflow tunnel upstream of the plurality of waveguide passages; and a second screen positioned in the airflow tunnel downstream of the plurality of waveguide passages. The microwave energy sources and the first and second screens create a guided, standing wave, microwave energy that substantially prevents at least one of ice and frost from forming on the air filters. A turbine system including the ice and/or frost preventing system is also described.

20 Claims, 5 Drawing Sheets

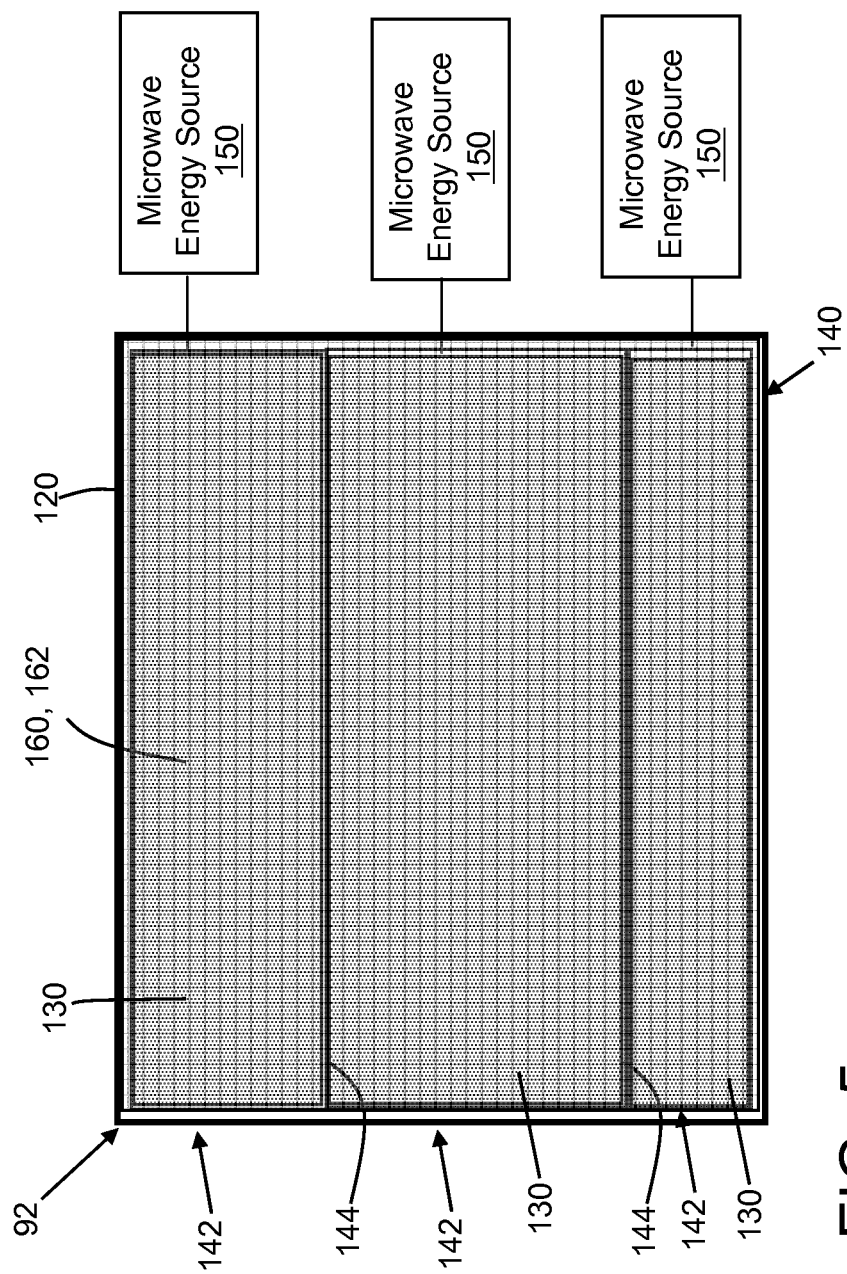

SYSTEM FOR ICE AND/OR FROST PREVENTION USING GUIDED WAVE ENERGY

BACKGROUND

1. Technical Field

The disclosure relates generally to air filtering, and more particularly, to a system for ice and/or frost prevention using guided wave energy, and a turbine including such a system.

2. Background Art

Turbines use a filtered airflow that is pulled into the turbine through an inlet. Typically, a housing positions the filter(s) at the inlet. One challenge for this structure is that ice and/or frost accumulates on the filtrate(s) inside of the housing in sub-freezing conditions. Consequently, the turbine inlet filter needs de-icing and anti-icing processes in cold days. One approach to preventing icing includes re-routing exhaust heat (e.g., steam, gas exhaust or compressor discharge air) to the housing to elevate the inlet air temperature above the freezing temperature. However, this approach requires complex piping and results in performance losses due to the inefficient use of the energy. In another approach, ice melting and prevention is be achieved by introducing thermal energy only to ice and the icing surfaces using high frequency (wavelength 800 nm-300 mm), propagating microwave energy via radiators in the airflow inlet. This approach is ineffective because the propagating nature of the energy results in the energy density being too small to increase temperature, especially for larger filter housings. Enlarging the microwave energy source is expensive.

BRIEF DESCRIPTION OF INVENTION

A first aspect of the disclosure provides a system for preventing at least one of ice and frost for positioning in an airflow tunnel having an air inlet, the system comprising: a plurality of waveguide passages positioned in the airflow tunnel; an air filter positioned in each waveguide passage; a microwave energy source coupled to each waveguide passage; a first screen positioned in the airflow tunnel upstream of the plurality of waveguide passages; and a second screen positioned in the airflow tunnel downstream of the plurality of waveguide passages, wherein the microwave energy sources and the first and second screens create a guided, standing wave, microwave energy that prevents at least one of ice and frost from forming on the air filters.

A second aspect of the disclosure provides a turbine system comprising: a turbine engine; and an air intake housing coupled to the turbine engine, the air intake housing including: an airflow tunnel including an air inlet for receiving an airflow, a plurality of waveguide passages positioned in the airflow tunnel, an air filter positioned in each waveguide passage, a microwave energy source coupled to each waveguide passage, a first screen positioned in the airflow tunnel upstream of the plurality of waveguide passages, and a second screen positioned in the airflow tunnel downstream of the plurality of waveguide passages, wherein the microwave energy sources and the first and second screens create a guided, standing wave, microwave energy that prevents at least one of ice and frost from forming on the air filters.

A third aspect of the disclosure includes a system comprising: an airflow tunnel including an air inlet for receiving an airflow having a temperature of less than or equal to 0° C.; a system for preventing formation of at least one of ice and frost, the system including: a plurality of waveguide passages positioned in the airflow tunnel; an air filter positioned in each waveguide passage; a microwave energy source coupled to each waveguide passage, the microwave energy source generating a microwave energy having a frequency in the range of approximately 800 to 930 megaHertz; a first screen positioned in the airflow tunnel upstream of the plurality of waveguide passages; and a second screen positioned in the airflow tunnel downstream of the plurality of waveguide passages, wherein the microwave energy sources and the first and second screens create a guided, standing wave, microwave energy that prevents at least one of ice and frost from forming on the air filters.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 shows an end cross-sectional view of the system according to alternative embodiments of the invention.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
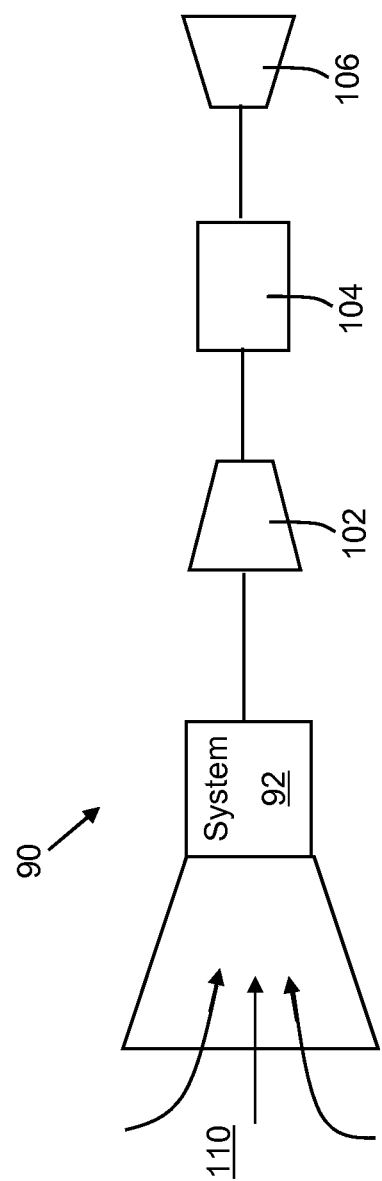
FIG. 1 shows a schematic diagram of an illustrative turbine system including a system according to embodiments of the invention.

Referring to the drawings, FIG. 1 shows a schematic diagram of a turbine system 90 including a system 92 for substantially preventing ice and/or frost formation on an air filters 130 (FIG. 3) therein according to embodiments of the invention. While system 92 will be described relative to a turbine system application, it is understood that the teachings of the invention are applicable to any situation requiring prevention of ice or frost on an air filter or other structure. The illustrative application is not meant to limit the scope of the invention.

With continuing reference to FIG. 1, turbine system 90 also includes a compressor 102, a combustor 104 and a turbine 106 that receives the product of combustor 104 for conversion thereof to energy. Hence, system 92 is indirectly coupled to an inlet of turbine engine.

Figure 2:
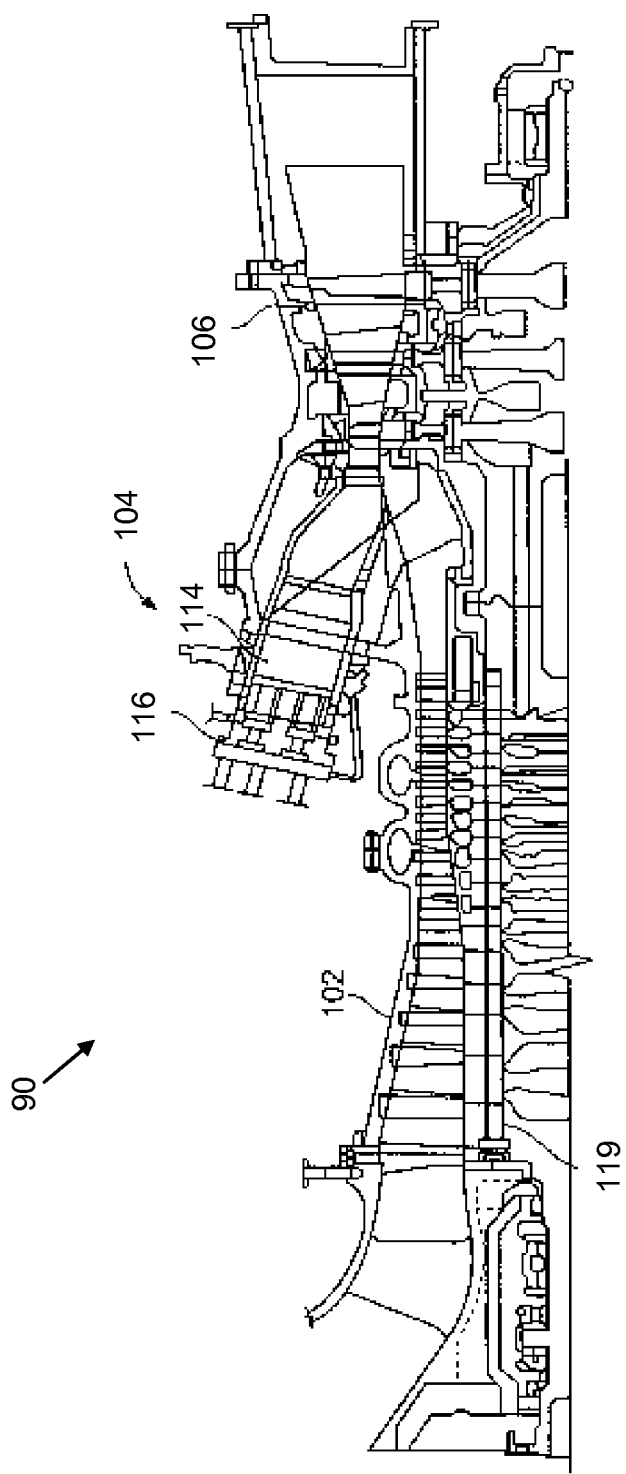
FIG. 2 shows a more detailed schematic diagram of the illustrative turbine system according to embodiments of the invention.

FIG. 2 shows a more detailed schematic illustration of parts of turbine system 90 including compressor 102 and combustor 104. Combustor 104 includes a combustion region 114 and a fuel nozzle assembly 116. Turbine system 90 also includes turbine 106 and a common compressor/turbine rotating shaft 119 (sometimes referred to as a rotor 119). In one embodiment, turbine system 90 is a MS7001FB engine, sometimes referred to as a 9FB engine, commercially available from General Electric Company, Greenville, S.C. The present invention is not limited to any one particular engine and may be implemented in connection with other engines including, for example, the MS7001FA (7FA) and MS9001FA (9FA) engine models of General Electric Company.

In operation, air flows through compressor 102 and compressed air is supplied to combustor 104. Specifically, the compressed air is supplied to fuel nozzle assembly 116 that is integral to combustor 104. Assembly 116 is in fluid communication with combustion region 114. Fuel nozzle assembly 116 is also in fluid communication with a fuel source (not shown in FIG. 1) and channels fuel and air to combustion region 114. Combustor 104 ignites and combusts fuel. Combustor 104 is in fluid communication with turbine 106 for which gas stream thermal energy is converted to mechanical rotational energy. Turbine 106 is rotatably coupled to and drives rotating shaft 119. Compressor 102 also is rotatably coupled to rotating shaft 119. Compressor 102 may include any now known or later form of compressor system for creating an airflow 110 (FIG. 1) into turbine system 90. Airflow 110 may have a temperature of less than or equal to 0° C., i.e., it has a temperature to create ice or frost on surfaces, in at least a portion thereof. In the illustrative embodiment, there are a plurality of combustors 104 and fuel nozzle assemblies 116. In the following discussion, unless otherwise indicated, only one of each component will be discussed.

Figure 3:
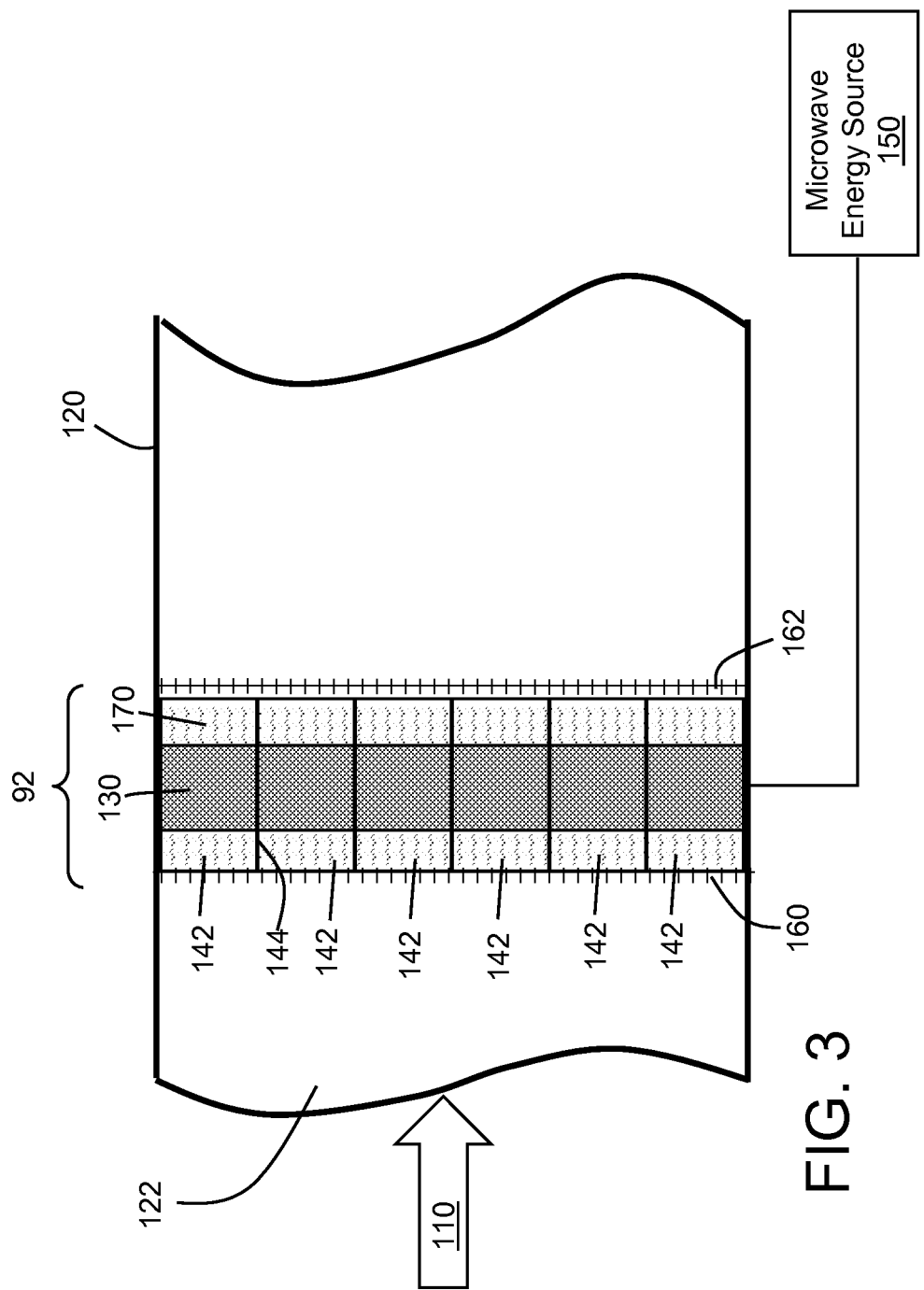
FIG. 3 shows a side cross-sectional view of the system according to embodiments of the invention.
Figure 4:
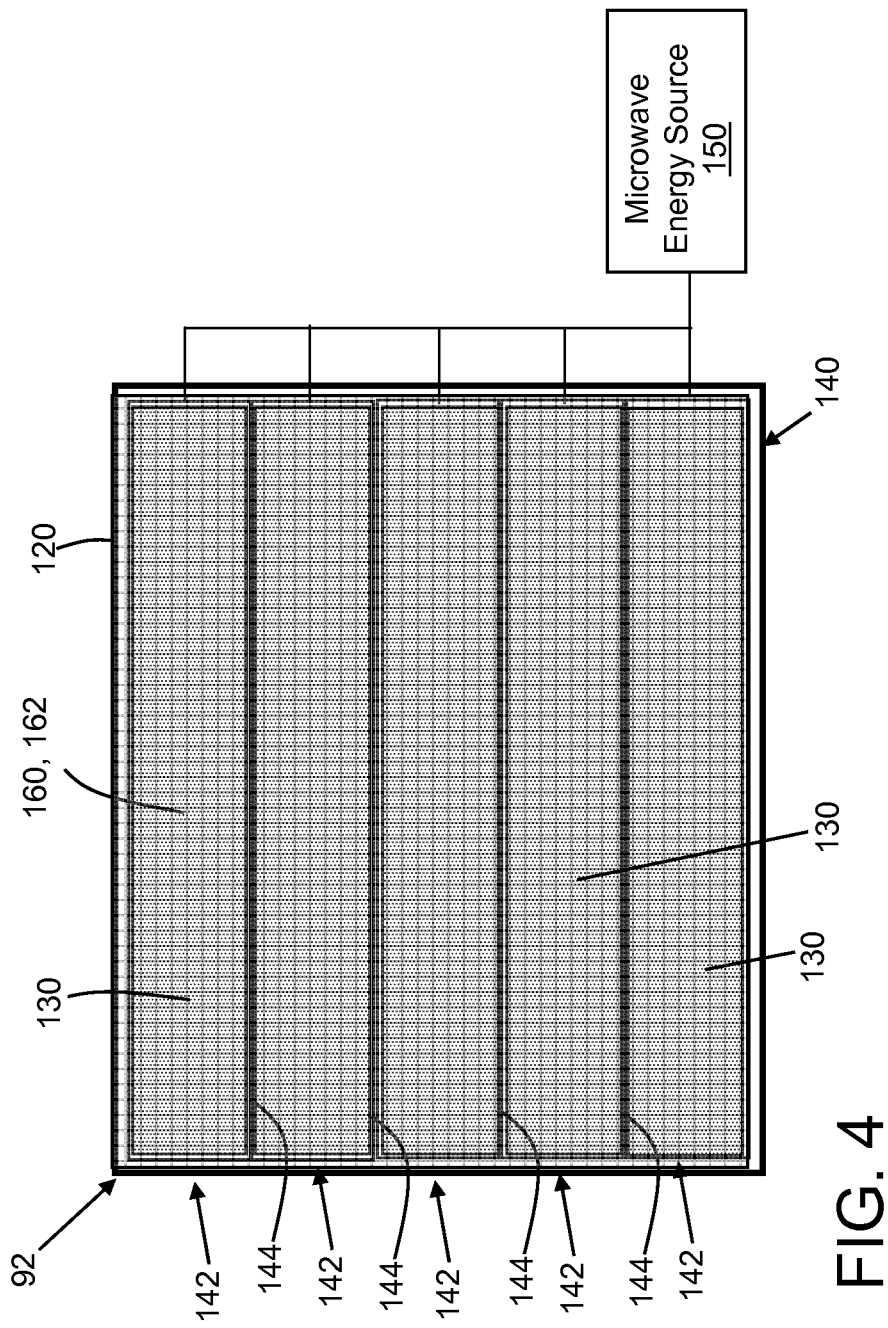
FIG. 4 shows an end cross-sectional view of the system according to embodiments of the invention.

Referring to FIGS. 3 and 4, details of system 92 will now be described. As shown best in FIG. 3, system 92 may be positioned in an airflow tunnel 120 including an air inlet 122 for receiving airflow 110, created by compressor 102 (FIG. 1). As understood, airflow tunnel 120 is typically a large (e.g., one or more meters in diameter) opening that extends from a point external of turbine system 90 to compressor 102. System 92 includes a plurality of waveguide passages 142 positioned in airflow tunnel 120 that segment airflow tunnel 120 into a number of smaller portions. In the case of a rectangular airflow tunnel 120, as illustrated, waveguide passages 142 may be formed by a number of horizontal plates 144 extending between sides or across airflow tunnel 120. It is understood, however, that a variety of other structures may also be implemented depending on the shape of airflow tunnel 120, e.g., curved plates, horizontal plates, angled plates, etc. The number of waveguide passages 142 may vary depending on the amount of microwave energy required for particular segments of airflow tunnel 120. For example, airflow tunnel 120 may be structured such that ice or frost formation is known to be more significant in certain segments than others. Six waveguide passages 142 are shown in FIG. 3, five in FIG. 4 and three in FIG. 5. In FIGS. 4 and 5, screen 160 is in front of air filters 130. In addition, as shown by comparing FIGS. 3-5, the size of each waveguide passage 142 may vary depending on the amount of microwave energy required for particular segments of airflow tunnel 120. An air filter 130 is positioned in each passage 142 to filter the airflow 110 as it passes therethrough. Each air filter 130 may include any now known or later developed filter material, e.g., those used for industrial purposes.

In FIG. 4, a microwave energy source 150 is coupled to each waveguide passage 142. Microwave energy source 150 may include any now known or later developed microwave generator, e.g., an industrial magnetron (mounted externally of airflow tunnel 120 and including an input to each waveguide passage 142) or other microwave source capable of generating approximately 800 to 930 megaHertz (MHz) standing wave microwave energy 170 in airflow tunnel 120. In one embodiment, the microwave energy has a frequency of approximately 915 MHz. In an alternative embodiment, shown in FIG. 5, each waveguide passage 142 may include its own respective microwave energy source 150. In this manner, different segments of airflow tunnel 120 or air filters 130 may receive different amounts of microwave energy.

As shown in FIGS. 3 and 4, system 92 also includes a first screen 160 positioned in airflow tunnel 120 upstream of plurality of waveguide passages 142, and a second screen 162 positioned in airflow tunnel 120 downstream of waveguide passages 142. Each screen 160, 162 may extend across airflow tunnel 120 in its entirety, or in an alternative embodiment, each waveguide passage 142 may include its own set of screens 160, 162. In one embodiment, each screen 160, 162 may have openings in the range of approximately 0.5 to 1.5 centimeters in size, or more particularly of approximately 1 centimeter, so as to provide extremely little resistance to airflow 110.

In conjunction with microwave energy source(s) 150, screens 160, 162 create a guided, standing wave, microwave energy 170 (FIG. 3) that substantially prevents ice and/or frost from forming on air filters 130. As noted above, guided, standing wave, microwave energy 170 may have a frequency in the range of approximately 800 to 930 MHz, and in particular, approximately 915 MHz. In addition, guided, standing wave, microwave energy 170 has a wavelength in the range of approximately 10 centimeters to approximately 60 centimeters, and more particularly of greater than approximately 30 centimeters, e.g., 32 centimeters. As understood, a standing wave, microwave energy 170 has a fixed minimum amplitude and fixed maximum amplitude, unlike a conventionally used, propagating microwave. Waveguide passages 142 and screens 160, 162 work to concentrate guided, standing wave, microwave energy 170 to where it is required with sufficient energy density without increasing the size of microwave energy source(s) 150.

The heating of ice or frost is generally not effective by microwave. However, when an airflow tunnel 120 has nothing more absorptive than ice or frost, microwave energy tends to focus on the most lossy materials, e.g. ice or frost. Ice or frost (not shown) in airflow tunnel 120 or on air filters 130 typically is not 100% water because the surfaces thereof are not clean. In such condition, ice or frost can be relatively lossy. Therefore, the ice or frost can be melted or substantially prevented by system 92.

An advantage that may be realized in the practice of some embodiments of the described systems and techniques is a higher turbine efficiency and power output under cold conditions because airflow 110 experiences a smaller pressure loss in comparison with flowing through a filter with ice and/or frost thereon. In addition, system 92 is cost effective for initial equipment, e.g., a microwave energy source 150 is significantly less expensive than conventional steam heater, and is more reliable because the steam heater is eliminated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system for preventing at least one of ice and frost for positioning in an airflow tunnel having an air inlet, the system comprising:
    a plurality of waveguide passages positioned in the airflow tunnel;
    an air filter positioned in each waveguide passage;
    a microwave energy source coupled to each waveguide passage;
    a first screen positioned in the airflow tunnel upstream of the plurality of waveguide passages; and
    a second screen positioned in the airflow tunnel downstream of the plurality of waveguide passages,
    wherein the microwave energy sources and the first and second screens create a guided, standing wave, microwave energy that prevents at least one of ice and frost from forming on the air filters.

2. The system of claim 1, wherein the airflow has a temperature of less than or equal to 0° C.

3. The system of claim 1, wherein the guided, standing wave, microwave energy has a frequency in the range of approximately 800 to 930 megaHertz.

4. The system of claim 1, wherein the guided, standing wave, microwave energy has a frequency of approximately 915 megaHertz.

5. The system of claim 1, wherein the guided, standing wave, microwave energy has a wavelength in a range of approximately 10 centimeters to approximately 60 centimeters.

6. The system of claim 1, wherein the microwave energy source includes a magnetron mounted externally of the airflow tunnel and including an input to each waveguide passage.

7. The system of claim 1, wherein each waveguide passage includes a plate extending between sides of the airflow tunnel.

8. The system of claim 1, wherein the airflow tunnel is indirectly coupled to an inlet of a gas or steam turbine engine.

9. The system of claim 1, wherein each waveguide passage includes a respective microwave energy source coupled thereto.

10. The system of claim 1, wherein each screen has openings in a range of approximately 0.5 centimeters to approximately 1.5 centimeters in size.

11. A turbine system comprising:
    a turbine engine; and
    an air intake housing coupled to the turbine engine, the air intake housing including:
    an airflow tunnel including an air inlet for receiving an airflow,
    a plurality of waveguide passages positioned in the airflow tunnel,
    an air filter positioned in each waveguide passage,
    a microwave energy source coupled to each waveguide passage,
    a first screen positioned in the airflow tunnel upstream of the plurality of waveguide passages, and
    a second screen positioned in the airflow tunnel downstream of the plurality of waveguide passages,
    wherein the microwave energy sources and the first and second screens create a guided, standing wave, microwave energy that prevents at least one of ice and frost from forming on the air filters.

12. The turbine system of claim 11, wherein the airflow has a temperature of less than or equal to 0° C.

13. The turbine system of claim 11, wherein the guided, standing wave, microwave energy has a frequency in the range of approximately 800 to 930 megaHertz.

14. The turbine system of claim 11, wherein the guided, standing wave, microwave energy has a frequency of approximately 915 megaHertz.

15. The turbine system of claim 11, wherein the guided, standing wave, microwave energy has a wavelength in a range of approximately 10 centimeters to approximately 60 centimeters.

16. The turbine system of claim 15, wherein the wavelength is greater than approximately 30 centimeters.

17. The turbine system of claim 11, wherein the microwave energy source includes a magnetron mounted externally of the airflow tunnel and including an input to each waveguide passage.

18. The turbine system of claim 11, wherein each waveguide passage includes a plate extending between sides of the airflow tunnel.

19. The turbine system of claim 11, wherein each waveguide passage includes a respective microwave energy source coupled thereto.

20. A system comprising:
    an airflow tunnel including an air inlet for receiving an airflow having a temperature of less than or equal to 0° C.;
    a system for preventing formation of at least one of ice and frost, the system including:
    a plurality of waveguide passages positioned in the airflow tunnel;
    an air filter positioned in each waveguide passage;
    a microwave energy source coupled to each waveguide passage, the microwave energy source generating a microwave energy having a frequency in the range of approximately 800 to 930 megaHertz;
    a first screen positioned in the airflow tunnel upstream of the plurality of waveguide passages; and
    a second screen positioned in the airflow tunnel downstream of the plurality of waveguide passages,
    wherein the microwave energy sources and the first and second screens create a guided, standing wave, microwave energy that prevents at least one of ice and frost from forming on the air filters.

* * * * *